Feb. 21, 1933.  C. REDFORD  1,898,217
SPRING MOUNTING
Filed May 13, 1929
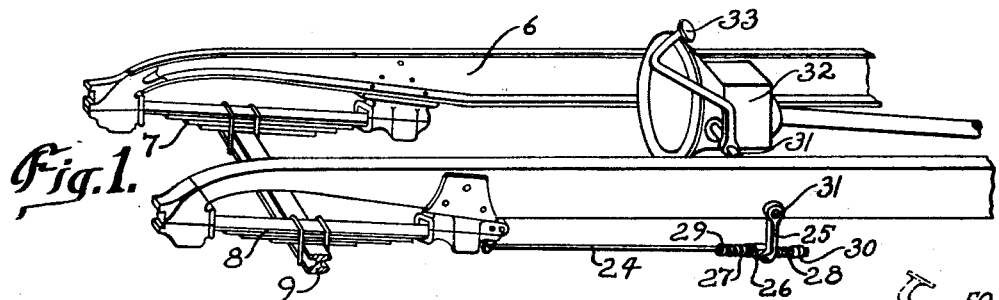
Fig. 1.
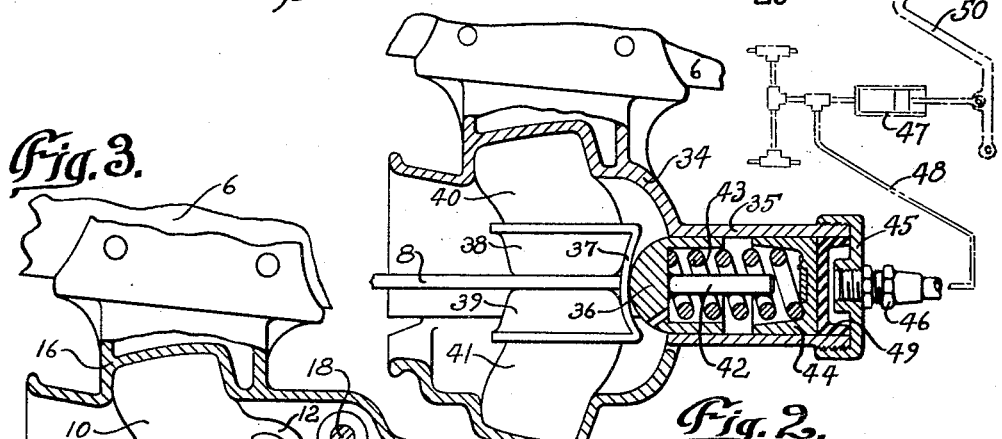
Fig. 3.
Fig. 2.
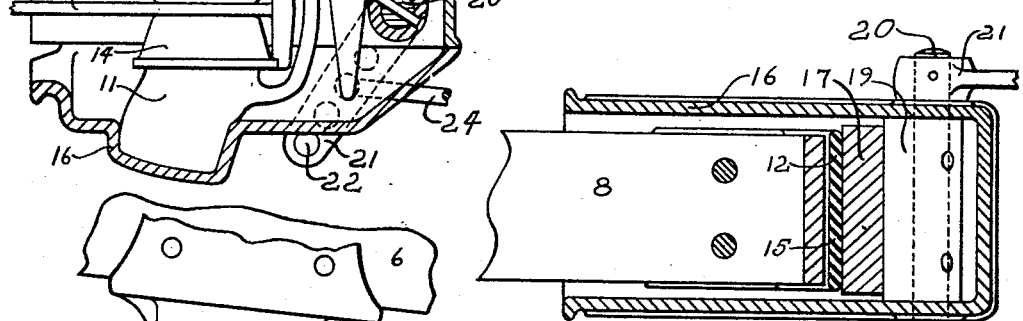
Fig. 5.
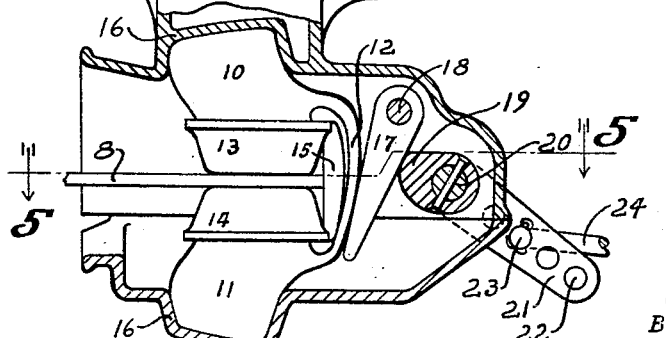
Fig. 4.
INVENTOR
CARLYLE REDFORD
BY
ATTORNEY Patented Feb. 21, 1933

1,898,217

UNITED STATES PATENT OFFICE

CARLYLE REDFORD, OF DETROIT, MICHIGAN, ASSIGNOR TO CHRYSLER CORPORATION, OF DETROIT, MICHIGAN, A CORPORATION OF DELAWARE

SPRING MOUNTING

Application filed May 13, 1929. Serial No. 362,615.

This invention relates to spring mounting for automobile chassis.

The main objects of the invention are to provide an improved structure particularly adapted for mounting the rear end of the front spring; to provide a device which will counteract or resist rearward movement of a floating spring when the wheel brakes of the motor vehicle are applied; to provide an improved construction which will prevent a motor vehicle equipped with one floating front spring from side diving when the brakes are applied, and to provide an improved construction which can be adapted for use in connection with either mechanical or hydraulic wheel brakes.

An illustrative embodiment of this invention is shown in the accompanying drawing, in which:

Fig. 1 is a view in perspective of the front of a chassis frame with front springs, axle and brake connections shown thereon, and showing my improved invention adapted thereon.

Fig. 2 is an enlarged vertical sectional view of the left front spring rear mounting housing arranged for hydraulic wheel brake control, with the hydraulic brake connections shown diagrammatically in dotted outline.

Fig. 3 is a similar view of my improved invention as illustrated in Fig. 1.

Fig. 4 is a view of the same with the mechanism in inoperative position.

Fig. 5 is a sectional view taken on the line 5—5 of Fig. 4.

In the development of front spring mounting wherein one of the front springs of a motor vehicle is mounted so as to have a floating action for the purpose of overcoming "shimmying" of the front wheels, when the brakes are applied the front spring so mounted has a tendency to shift rearwardly of the chassis frame, thereby causing the motor car to have a side diving action or motion. This is particularly true where the front springs are mounted in rubber blocks, one of the front springs being mounted in blocks of relatively stiff rubber and the other spring mounted in blocks of relatively soft or yielding rubber.

A constant pressure or force exerted against the rear end of the floating spring is objectionable because it does not permit free floating movement of the spring which is requisite in order to prevent the "shimmying".

In my improved invention the floating spring is permitted free and unrestricted action at all times except when the vehicle wheel brakes are applied, at which time suitable mechanism is actuated by the wheel brake connections so as to abut against and restrain rearward movement of the floating spring, thus keeping the front axle at right angles to the longitudinal axis of the chassis frame.

In the construction shown in Figs. 1, 3, 4, and 5 of the drawing, which is directed to a mechanical application of the device, a chassis frame 6 is shown provided with front springs 7 and 8 which rest upon a front axle 9 in the usual manner. In this instance the front spring 8 is mounted so as to have a floating action, which permits rearward movement thereof relative to the chassis frame 6. The rear end of the leaf spring 8 is supported by and embraced between blocks of soft resilient rubber 10 and 11, which are connected by a web 12. The inner ends of the rubber blocks 10 and 11, set in metal cups 13 and 14, respectively, in the usual manner, the bottom of these cups resting directly against the opposite sides of the leaf spring 8 closely adjacent the rear end thereof.

A relatively thin rectangular metal plate 15 is secured to the cups 13 and 14, preferably by spot welding, and is disposed substantially perpendicularly to the end of the spring 8 and in position to abut thereagainst.

The rubber blocks 10 and 11 are supported by a housing frame 16, which is riveted or otherwise suitably secured to the chassis frame 6.

Immediately back of the plate 15 and rubber web 12 a wedge shaped steel plate 17 is swingably mounted at its upper end on a pin 18 carried by the housing frame 16.

Means are provided for swinging the plate 17 into abutting engagement with the web 12 and plate 15 and comprises a cam 19 rigidly secured on a cam shaft 20 journaled on the housing 16 on an axis parallel with the axis of the pin 18. The inner end of the cam shaft 20 protrudes outside of the housing 16 and is provided with an arm 21 rigidly secured thereto for rotating the cam shaft and cam. The arm 21 is provided with a plurality of spaced apertures 22 which are adapted to receive the transversely disposed end 23 of a wheel brake connection rod 24. The rod 24 extends rearwardly of the chassis frame and is resiliently connected to the lower end of a depending arm 25 through the medium of a block 26 slidably mounted on the rod 24, which is embraced between the inner ends of helical compression springs 27 and 28. The outer end of the spring 27 abuts against an annular shoulder 29 rigidly secured on the rod 24, and the outer end of the spring 28 abuts against a nut 30 threaded on the end of the rod 24. The upper end of the arm 25 is rigidly secured on the protruding end of a brake shaft 31 journaled on the chassis frame and transmission housing 32. A brake pedal 33 is secured on the shaft 31 for rotating said shaft so as to swing the arm 25 rearwardly when the brakes are applied.

In the operation of this embodiment of the invention the cam 19 is normally in a retracted position, as shown in Fig. 3 of the drawing, thereby permitting free floating action of the spring 8 in its resilient mounting. When the vehicle wheel brakes are applied the pedal 33 is depressed, thus rotating shaft 31 and swinging the arm 25 rearwardly. Such movement of the arm 25 draws the rod 24 to the rear, thus swinging the arm 21 rearwardly to the position shown in Fig. 4 of the drawing. This movement of the arm 21 rotates the cam shaft 20 so as to move the cam 19 into engagement with the swinging plate 17 and force said plate upwardly against the rubber web 12 and metal plate 15 which is in abutting relation with the rear end of the leaf spring 8, thus preventing rearward movement of the said spring relative to the housing frame 16 and chassis frame 6. In the embodiment shown in Fig. 2 of the drawing, the spring 8 is shown mounted within a housing frame 34, which is provided at its rear end with a hydraulic cylinder 35. A plunger 36 is slidably mounted within the cylinder 35 with its front end normally abutting against a concave plate 37, which may be formed integrally with metallic cups 38 and 39, within which are seated rubber blocks 40 and 41.

The plunger 36 is provided with an axially extending stem 42 which is surrounded by a helical compression spring 43, one end of which abuts against the plunger 36 and the other end of which abuts against the hydraulic piston 44. The outer end of the hydraulic cylinder 35 is closed by a cap 45 threaded thereon, through which hydraulic brake connections 46 are threaded for connecting up to the master brake cylinder 47 through connections 48. A suitable cup 49 is provided within the cylinder 35 for preventing fluid from the hydraulic brake line from passing by the piston 44.

In the operation of the hydraulic adaptation shown in Fig. 2 of the drawing, when the vehicle wheel brakes are applied through brake pedal 50, fluid from the master cylinder 47 passes through the line 48, connection 46 and into the hydraulic cylinder 35, thereby forcing the piston 44 inwardly in the cylinder. The piston 44 and plunger 36 are normally held in yieldingly spaced relationship by the helical compression spring 43. Inward movement of the piston 44 causes the spring 43 to press the plunger 36 against the concave plate 37 which is in abutting relationship with the end of the leaf spring 8. Upon heavy application of the brakes, the spring 43 is compressed so that the piston 44 makes direct contact with the plunger 36 and forces the same tightly against leaf spring mounting so as to effectually prevent rearward shifting of the spring 8 when the brakes are applied.

Although but one specific embodiment and one modification of this invention have been herein shown and described, it will be understood that numerous details of the constructions shown may be altered or omitted without departing from the spirit of this invention and as defined by the following claims.

What I claim is:

1. A spring mounting comprising a frame, yielding means on said frame for supporting the end of a leaf spring, said spring having longitudinal shifting with respect to said supporting means, and normally inoperative means for releasably resisting such longitudinal shifting.

2. A spring mounting comprising a frame, yielding means on said frame for supporting the end of a leaf spring, said spring having longitudinal shifting with respect to said supporting means, and normally inoperative manually operable means for resisting such longitudinal shifting.

3. A spring mounting comprising a frame, yielding means on said frame for supporting the end of a leaf spring, said spring having longitudinal shifting with respect to said supporting means, and normally inoperative shiftable means adapted to abut against the end of such leaf spring for selectively resisting and permitting such longitudinal shifting.

4. A spring mounting comprising a housing frame, yielding members in said housing for supporting and embracing the opposite sides of a leaf spring end, said spring having longitudinal shifting with respect thereto, and normally inoperative means shiftably mounted on said housing for resisting such longitudinal shifting in one direction.

5. A spring mounting comprising a housing frame, yielding members in said housing for supporting and embracing the opposite sides of a leaf spring end, said spring having longitudinal shifting with respect thereto, and normally inoperative manually operable means on said housing for resisting such longitudinal shifting in one direction.

6. A spring mounting comprising a housing frame, yielding members in said housing for supporting and embracing the opposite sides of a leaf spring end, said spring having longitudinal shifting with respect thereto, and variable means on said housing adapted to abut against the end of such spring and to move out of contact thereof, respectively so as to selectively restrain or permit such longitudinal shifting in one direction.

7. A spring mounting comprising a housing frame, yielding members in said housing for supporting and embracing the opposite sides of a leaf spring end, said spring having longitudinal shifting with respect thereto, and normally inoperative manually operable means adapted to abut against the end of such spring on said housing for resisting such longitudinal shifting in one direction.

8. A spring mounting comprising a frame, means on said frame for supporting the end of a leaf spring, said spring having longitudinal shifting with respect to said supporting means, and normally inoperative manually operable means adapted to abut against the end of such spring for resisting such longitudinal shifting.

9. A spring mounting comprising a frame, means on said frame for supporting the end of a leaf spring, said spring having longitudinal shifting with respect to said supporting means, a plunger slidably mounted on said frame with one end abutting the end of such spring and hydraulic brake connections for moving said plunger to resist longitudinal movement of such spring.

10. A spring mounting comprising a frame, means on said frame for supporting the end of a leaf spring, said spring having longitudinal shifting with respect to said supporting means, a plunger slidably mounted on said frame with one end abutting the end of such spring, a helical compression spring having one end bearing against said plunger, a hydraulic piston bearing against the other end of said compression spring, and hydraulic brake connections for actuating said piston.

11. In a motor vehicle construction, the combination of a chassis frame, leaf springs on said frame for supporting an axle, mountings for one of said springs providing for rearward shifting thereof, wheel brake connections on said frame, and means operated by said brake connections for resisting such rearward shifting of said spring.

12. A spring mounting comprising a frame, means on said frame for supporting the end of a leaf spring, said spring having longitudinal shifting with respect to said supporting means, a cam journaled on said frame for abutting the end of such spring to resist longitudinal movement thereof, and wheel brake connections to said cam for actuating the same.

13. In a motor vehicle construction, the combination of a chassis frame, leaf springs on said frame for supporting an axle, mountings for one of said springs providing for rearward shifting thereof, wheel brake connections on said frame, a cam shaft journaled on one of said spring mountings, a cam on said shaft for engaging the end of the spring in said mounting, an arm on said shaft for rotating said cam, and connections between said arm and wheel brake connections for moving said cam into engagement with said spring end.

14. In a vehicle including a frame, a spring mounting including means on said frame for supporting the end of a leaf spring, said spring having longitudinal shifting with respect to said supporting means, and normally inoperative means for holding said spring against such longitudinal shifting including control mechanism within reach of an operator of said vehicle for selectively rendering said latter means operative.

15. In a vehicle including a frame, a spring mounting including means on said frame for supporting the end of a leaf spring, said spring having longitudinal shifting with respect to said supporting means, resilient elements in said spring mounting for yieldably opposing such longitudinal shifting of said spring, and normally inoperative means adapted to be manually applied for holding said spring against shifting longitudinally.

16. A spring mounting including a frame, means on said frame for supporting the end of a leaf spring, said spring having longitudinal shifting with respect to said supporting means and normally inoperative means for holding said spring against such shifting having an element engageable with the end of said leaf spring and including control mechanism for selectively bringing said element into operative engagement with said spring end.

CARLYLE REDFORD.